US012771995B1

(12) United States Patent
Lu et al.

(10) Patent No.: US 12,771,995 B1
(45) Date of Patent: Oct. 20, 2026

(54) AUDIO ADJUSTMENT SYSTEM AND METHOD

(71) Applicant: GUANGDONG DINGCHUANG SMART MANUFACTURING CO., LTD., Dongguan (CN)

(72) Inventors: Jun Lu, Dongguan (CN); Yu Yang, Dongguan (CN); Liang Fang, Dongguan (CN)

(73) Assignee: GUANGDONG DINGCHUANG SMART MANUFACTURING CO., LTD., Dongguan (CN)

( * ) Notice: Subject to any disclaimer, the term of this patent is extended or adjusted under 35 U.S.C. 154(b) by 0 days.

(21) Appl. No.: 19/382,518

(22) Filed: Nov. 7, 2025

(30) Foreign Application Priority Data

Oct. 18, 2025 (CN) ........................ 202511494985.2

(51) Int. Cl.
*H04R 3/00* (2006.01)

(52) U.S. Cl.
CPC ........... *H04R 3/00* (2013.01); *H04R 2420/01* (2013.01); *H04R 2420/07* (2013.01); *H04R 2420/09* (2013.01); *H04R 2430/01* (2013.01); *H04R 2430/03* (2013.01)

(58) Field of Classification Search
CPC .. H04R 3/00; H04R 2420/07; H04R 2420/09; H04R 2430/01
USPC .................................. 381/119, 109; 700/94
See application file for complete search history.

(56) References Cited

U.S. PATENT DOCUMENTS 6,970,752 B1 * 11/2005 Lim ....................... H03M 11/24 381/123
11,119,724 B2 * 9/2021 O'Donnell ................ H04S 7/00
11,959,621 B2 * 4/2024 Abercrombie, III ......................... F21V 23/0471
12,520,072 B2 * 1/2026 Watanabe ............. A63F 13/215
2022/0050702 A1 * 2/2022 Arya ................... G06F 9/45558
2023/0344928 A1 * 10/2023 Alihassan ........... H04M 1/6066
2025/0240572 A1 * 7/2025 Dusan ................. H04M 1/6008

* cited by examiner

*Primary Examiner* — Disler Paul
(74) *Attorney, Agent, or Firm* — HOWARD M COHN and Associates, LLC

(57) ABSTRACT

An audio adjustment system includes a control device and a terminal. The control device includes a first audio control unit, a second audio control unit, and a first output port. The first/second audio control unit receives a first/second adjustment instruction based on user's input and outputs the first/second adjustment instruction to the first output port. The terminal includes a first input port, an audio processing module, and an audio module. The first input port receives the first/second adjustment instruction and outputs the first/second adjustment instruction to the audio processing module. The audio module includes a first audio application and a second audio application. The audio processing module adjusts audio parameters of audio stream of the first/second audio application in response to the first/second adjustment instruction. The first/second adjustment instruction is generated based on the user's physical operations on the first/second audio control unit.

15 Claims, 4 Drawing Sheets

AUDIO ADJUSTMENT SYSTEM AND METHOD

CROSS-REFERENCE TO RELATED APPLICATIONS

The application claims priority of Chinese patent application CN2025114949852, filed on Oct. 18, 2025, which is incorporated herein by reference in its entirety.

FIELD

The present disclosure relates to peripherals for mobile devices, and in particular, to an audio adjustment system and an audio adjustment method.

BACKGROUND

Currently, operating modes of vast majority of consumer-grade and entry-level professional sound cards are designed based on the master volume architecture of the operating system. The sound card hardware connects to the computer via a USB interface and is recognized by the system as a unified audio output device. Physical knobs or faders on its panel are typically directly mapped to the system's master volume control or can only adjust the level gains of the sound card hardware's various input interfaces (such as microphone and line-in). This means that the audio streams from all applications running on the computer are mixed internally within the operating system and ultimately sent to the sound card as a unified digital stream, which is then converted by the sound card into an analog signal for output.

In existing technologies, what users actually adjust through the physical controls of the sound card is the overall volume level of this mixed signal, without ability to trace back to individual audio sources that constitute this mixed signal. This technical architecture has an obvious usability drawback, namely, the lack of independent hardware control over the volume of individual applications. If users want to adjust the volume of a specific software (such as a game, music player, or chat tool) separately, they must manually switch back to the computer desktop and perform software click operations within the software interface or the operating system's volume mixer. This process interrupts the user's primary task (such as gaming or live streaming), involves a lengthy and non-intuitive operation path, and does not allow for blind operation, thereby undermining the immersive experience and efficiency of use. The convenience and real-time advantages of physical controls are lost in this scenario, failing to meet needs of advanced users who require fine-grained management of multiple audio sources.

Therefore, there is an urgent need for an audio adjustment system to address the aforementioned issues encountered by sound cards.

SUMMARY

In order to solve shortcomings in existing technologies, the present disclosure is to provide an audio adjustment system, which allows a user to physically manipulate controls to adjust audio parameters of different applications without a need of returning to a main application interface for operation, which can avoid complexity and inconvenience of operation.

A first aspect of the present disclosure provides an audio adjustment system. The audio adjustment system includes a control device and a terminal. The control device includes a first audio control unit, a second audio control unit, and a first output port. The first/second audio control unit receives a first/second adjustment instruction based on user's input and outputs the first/second adjustment instruction to the first output port. The terminal includes a first input port, an audio processing module, and an audio module. The first input port receives the first/second adjustment instruction and outputs the first/second adjustment instruction to the audio processing module. The audio module includes a first audio application and a second audio application. The audio processing module adjusts audio parameters of audio stream of the first/second audio application in response to the first/second adjustment instruction. The first/second adjustment instruction is generated based on the user's physical operations on the first/second audio control unit.

A second aspect of the present disclosure provides an audio adjustment method. The audio adjustment method includes: running, at the terminal, a first audio application or a second audio application; receiving, at a first audio control unit, a first adjustment instruction generated by a user's operation on the first audio control unit; or receiving, at a second audio control unit, a second adjustment instruction generated by the user's operation on the second audio control unit; receiving, at a first output port, the first adjustment instruction or the second adjustment instruction; outputting, at the first output port, the first adjustment instruction or the second adjustment instruction to a first input port; outputting, at the first input port, the first adjustment instruction or the second adjustment instruction to an audio processing module; and adjusting, at the audio processing module, audio parameters of audio stream of the first audio application in an audio module independently in response to the first adjustment instruction; or adjusting, at the audio processing module, audio parameters of audio stream of the second audio application in the audio module independently in response to the second adjustment instruction.

Comparing with existing technologies, the audio adjustment system of the present disclosure enables users to directly manipulate physical controls without leaving the main application window, utilizing background-running software to achieve real-time, seamless, and independent control over audio parameters of specific applications. This significantly enhances intuitiveness, convenience, and immersion of multitasking audio management operations.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

REFERENCE NUMERALS

100, control device; 101, first audio control unit; 102, second audio control unit; 103, third audio control unit; 104, fourth audio control unit; 105, microprocessor; 106, analog-to-digital converter; 107, first output port;
20, terminal; 201, first input port; 202, monitoring module; 203, calling module; 204, audio processing module; 2041, processing chip; 205, audio module; 2051, first audio application; 2052, second audio application; 2053, third audio application; 2054, fourth audio application; 2055, first virtual drive channel; 2056, second virtual drive channel; 2057, third virtual drive channel; 2058, fourth virtual drive channel; and
30, output device.

DETAILED DESCRIPTION

Detailed description of the present disclosure is merely an interpretation of the present disclosure and is not a limitation of the present application. After reading this specification, those skilled in the art may make non-contributive modifications to the present embodiment as needed, but as long as they are within the scope of the claims of the present application, they are protected by patent laws.

To make aforementioned objectives, features, and advantages of the present disclosure more comprehensible, further detailed explanations are provided below in conjunction with the accompanying drawings and specific embodiments.

To facilitate a better understanding of proposed technical solutions by those skilled in the art, a clear and complete description of the technical solutions in the embodiments of the present disclosure will be presented below in conjunction with the accompanying drawings in the embodiments of the present disclosure. It is evident that described embodiments represent only a portion, rather than all, of the embodiments of the present disclosure. All other embodiments obtained by ordinary technicians in the field without creative efforts based on the embodiments of the present disclosure shall fall within the protection scope of the present disclosure.

Figure 1:
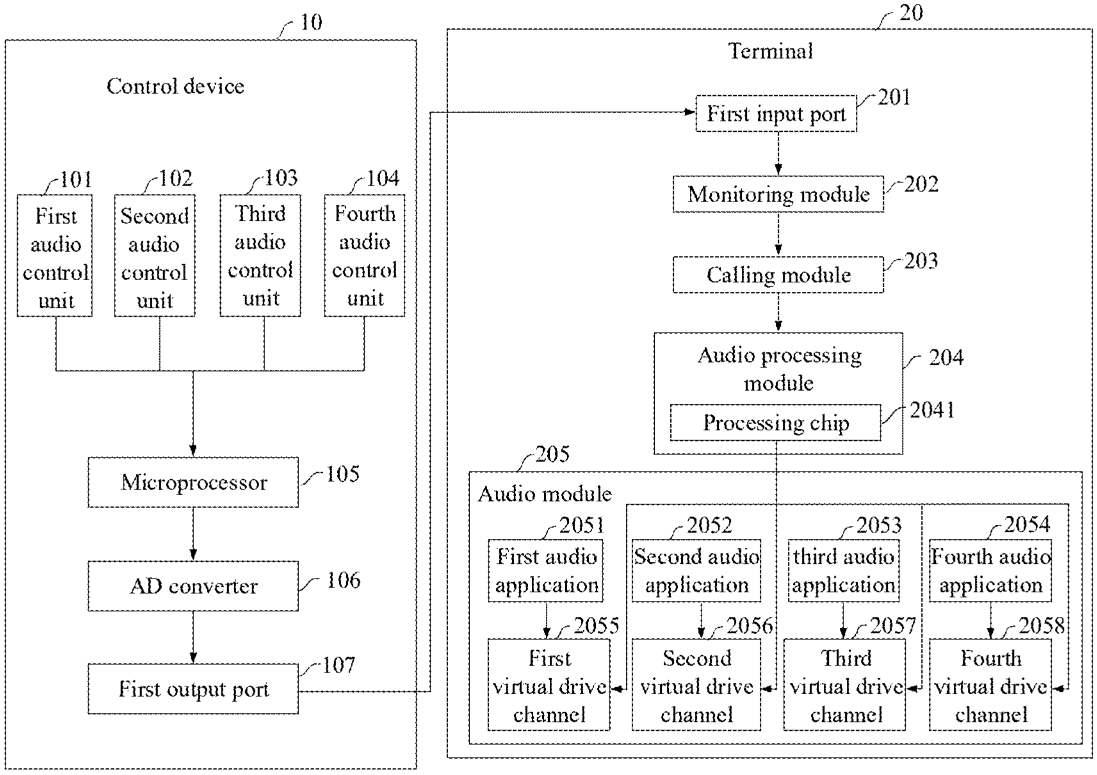
FIG. 1 is a modular schematic diagram of an audio adjustment system according to a first embodiment of the present disclosure.

An embodiment of the present disclosure provides a modular schematic diagram of an audio adjustment system. Please referring to FIG. 1. The system includes a control device 10, a terminal 20, and an output device 30. In this embodiment, the control device 10 is a sound card, the terminal 20 is a computer, and the output device 30 is a speaker or a headset.

The control device 10 includes a first audio control unit 101, a second audio control unit 102, a third audio control unit 103, a fourth audio control unit 104, a microprocessor 105, an analog-to-digital (AD) converter 106, and a first output port 107. The first audio control unit 101, the second audio control unit 102, the third audio control unit 103, and the fourth audio control unit 104 are physical controls used to adjust audio parameters of different audio applications. In this embodiment, they correspond to adjusting audio parameters of four applications including a microphone, a game, a chat, or a music, such as a volume, a gain, a pitch, sound effects, reverb, EQ, etc. The first audio control unit 101, the second audio control unit 102, the third audio control unit 103, and the fourth audio control unit 104 are preset with their corresponding applications to be adjusted at system initialization. In other embodiments of the present disclosure, the number of audio control units is not limited to four and can be other quantities, and the applications can be other corresponding combinations, with different corresponding relationships between them, not limited to this.

The first audio control unit 101, the second audio control unit 102, the third audio control unit 103, and the fourth audio control unit 104 receive first, second, third, and fourth adjustment instructions input by the user, respectively, and output them to the first output port 107. In the present disclosure, the first audio control unit 101, the second audio control unit 102, the third audio control unit 103, and the fourth audio control unit 104 all receive the aforementioned first, second, third, and fourth adjustment instructions through user physical operations.

In this embodiment, the first audio control unit 101, the second audio control unit 102, the third audio control unit 103, and the fourth audio control unit 104 may be linear potentiometers or rotary potentiometers that output analog voltage signals. The microprocessor 105 reads the analog voltage values, and the AD converter 106 converts the analog voltage values into digital voltage signals, which are then output to the first output port 107.

In other embodiments of the present disclosure, the first audio control unit 101, the second audio control unit 102, the third audio control unit 103, and the fourth audio control unit 104 may be linear encoders, rotary encoders, interactive control surfaces, or strike pads that directly output digital voltage signals. The microprocessor 105 reads the digital voltage values and outputs them to the first output port 107. In this case, the control device 10 may not require the AD converter 106. In this embodiment, the microprocessor 105 can be an STM32 series, ESP32, or a more advanced XMOS chip.

The terminal 20 includes a first input port 201, a monitoring module 202, a calling module 203, an audio processing module 204, and an audio module 205. Among them, the audio processing module 204 includes a processing chip 2041. The audio module 205 includes a first audio application 2051, a second audio application 2052, a third audio application 2053, a fourth audio application 2054, a first virtual drive channel 2055, a second virtual drive channel 2056, a third virtual drive channel 2057, and a fourth virtual drive channel 2058.

The first input port 201 is electrically connected to the first output port 107 and is configured to receive the first, second, third, and fourth adjustment instructions output through the first output port 107. In this embodiment, the first output port 107 has built-in USB functionality and sends the aforementioned digital voltage signals in the form of USB data packets to the first input port 201 through the Universal Serial Bus Human Interface Device Protocol (USB HID) protocol or a customized Universal Serial Bus Musical Instrument Digital Interface (USB MIDI) protocol. At this time, the first output port 107 and the first input port 201 are electrically connected through wired transmission, with the first output port 107 and the first input port 201 installed at both ends of a same digital transmission cable. The first output port 107 is a USB-A connector or a Type-C connector, and the first input port 201 is corresponding a USB-A connector or a Type-C connector.

In other embodiments of the present disclosure, the first output port 107 and the first input port 201 are electrically connected via wireless transmission. Both the first output port 107 and the first input port 201 are wireless transmission chips that communicate and connect through a 2.4 GHz wireless private transmission protocol, a Bluetooth® protocol, or an ultra-high frequency (UHF) wireless protocol. Alternatively, the first output port 107 is a wireless transmission chip, and the first input port 201 is a wireless receiver that can be hot-plugged into the terminal. The first output port 107 and the first input port 201 communicate and connect through the 2.4 GHz wireless private transmission protocol, the Bluetooth protocol, or the UHF wireless protocol.

The monitoring module 202 is electrically connected to the first input port 201 and is configured to monitor, identify, and extract the first, second, third, and/or fourth adjustment instructions output by the first input port 201. That is, it monitors the voltage change values of the first audio control unit 101, the second audio control unit 102, the third audio control unit 103, and the fourth audio control unit 104, and outputs the aforementioned adjustment instructions to the calling module 203. The calling module 203 analyzes the first, second, third, and/or fourth adjustment instructions and generates adjustment drive signals for driving the audio processing module 204. The audio processing module 204 adjusts the audio parameters of the audio streams from the first audio application 2051, the second audio application 2052, the third audio application 2053, and the fourth audio application 2054 in the audio module 205 according to the adjustment drive signals. In this embodiment, the audio parameters to be adjusted may include volume, gain, pitch, sound effects, reverb, or Equalizer (EQ).

Specifically, the monitoring module 202 monitors in real-time the digital voltage values output by the first output port 107 through the first input port 201. The calling module 203 calls an audio parameter adjustment mapping table that maps digital voltage values to audio parameter scales. This audio parameter adjustment mapping table is preset and stored in the terminal 20. In this embodiment, the digital voltage values are represented in binary numerical values ranging from (0-1023), corresponding to an audio parameter scale of (0.0-1.0) or (0%-100%). The calling module 203 looks up the audio parameter scale corresponding to the digital voltage signal monitored by the monitoring module 202 based on the audio parameter adjustment mapping table, generates the aforementioned adjustment drive signals, and outputs them to the audio processing module 204.

In this embodiment, the audio signals output by the first audio application 2051, the second audio application 2052, the third audio application 2053, and the fourth audio application 2054 enter the first virtual drive channel 2055, the second virtual drive channel 2056, the third virtual drive channel 2057, and the fourth virtual drive channel 2058, respectively. That is, the first audio application 2051 outputs the audio signal stream of the microphone, the second audio application 2052 outputs the audio signal stream of the game, the third audio application 2053 outputs the audio signal stream of the chat, and the fourth audio application 2054 outputs the signal stream of the music.

The processing chip 2041 in the audio processing module 204 adjusts the audio signals in the first virtual channel 2055 according to the first adjustment instruction, adjusts the audio signals in the second virtual channel 2056 according to the second adjustment instruction, adjusts the audio signals in the third virtual channel 2057 according to the third adjustment instruction, and adjusts the audio signals in the fourth virtual channel 2058 according to the fourth adjustment instruction. In other words, the processing chip 2041 adjusts the audio signal parameters entering the first virtual drive channel 2055, the second virtual drive channel 2056, the third virtual drive channel 2057, or the fourth virtual drive channel 2058 according to the adjustment drive signals output by the calling module 203. The audio parameters to be adjusted by the audio processing module 204 include gain, pitch, sound effects, reverb, or EQ.

In this embodiment, the first audio application 2051, the second audio application 2052, the third audio application 2053, and the fourth audio application 2054 are running in the background and are actual audio software running on the terminal 20, such as microphone, game, chat, or music. At this time, the audio processing module 204 responds to the first, second, third, and/or fourth adjustment instructions and adjusts the audio data output by the first audio application 2051, the second audio application 2052, the third audio application 2053, and the fourth audio application 2054 through an audio application programming interface (API) of the operating system of the terminal 20. At this time, the audio parameters to be adjusted by the audio processing module 204 includes volumes.

Figure 2:
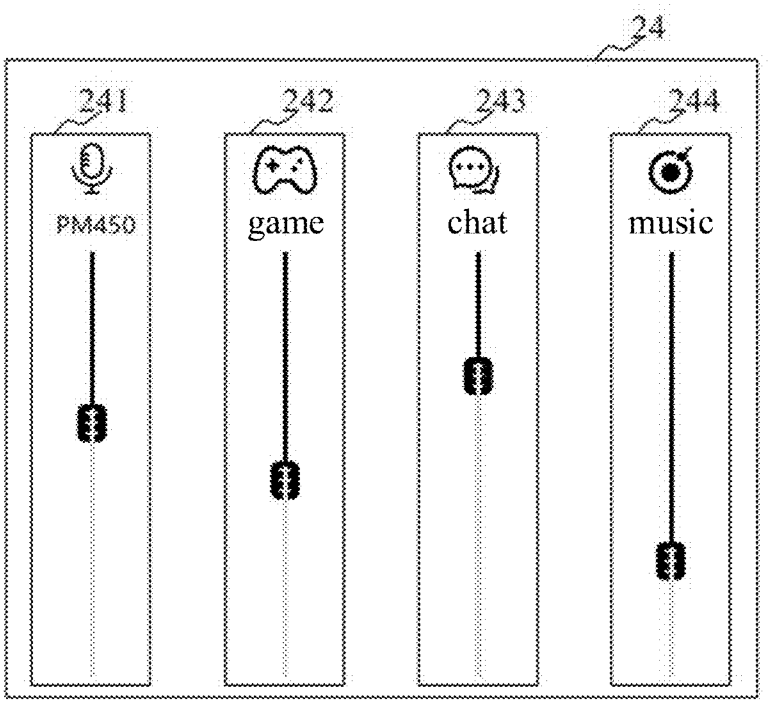
FIG. 2 illustrates a schematic diagram of an operation interface of a virtual audio software for a first audio application, a second audio application, a third audio application and a fourth audio application in FIG. 1 of the present disclosure.

In other embodiments of the present disclosure, the first audio application 2051, the second audio application 2052, the third audio application 2053, and the fourth audio application 2054 can be virtual audio software pre-created on the terminal 20, which has a specific operation interfaces shown in FIG. 2. The four virtual sliders are aligned and controlled through physical mapping with the first audio control unit 101, the second audio control unit 102, the third audio control unit 103, and the fourth audio control unit 104 in the control device 10, and are pre-created and installed on the terminal 20. Similarly, the audio processing module 204 responds to the first, second, third, and/or fourth adjustment instructions and adjusts the audio data output by the first audio application 2051, the second audio application 2052, the third audio application 2053, and the fourth audio application 2054 by adjusting the virtual audio software. At this time, the audio parameters to be adjusted by the audio processing module 204 include gain, pitch, sound effects, reverb, or EQ.

The output device 30 integrates and plays the audio output signals from the first audio application 2051, the second audio application 2052, the third audio application 2053, and the fourth audio application 2054.

Specifically, in this embodiment, the monitoring module 202 functions as a Hardware Event Listener or a Device State Monitor, and is configured to continuously monitor changes in the input status of hardware devices (physical controls). The calling module 203 serves as a Mapping Configuration Manager or Parameter Mapper, and is responsible for managing and invoking the mapping relationships between hardware controls and software (application) parameters, while also generating specific audio control instructions based on these mapping relationships. The audio module 204 can be a Virtual Audio Device Manager or a Software Audio Router, and is configured to create and manage virtual audio devices and routing channels. Alternatively, it can be another type of module that accomplishes similar functions.

For instance, when a user wishes to adjust audio parameters of the microphone independently, they need to manually adjust the first audio control unit 101 by sliding the fader up or down or rotating the knob clockwise or counterclockwise. As the position of the first audio control unit 101 changes, its corresponding voltage value changes accordingly. The microprocessor 105 reads the voltage change value of the first audio control unit 101 at this time and outputs it to the analog-to-digital conversion module 106, which converts it into digital voltage signals. The first output port 107 reads the aforementioned digital voltage signals and sends them to the terminal 20 in real-time via the USB HID protocol or a custom USB MIDI protocol. The voltage change value is represented as a binary number (0-1023). The monitoring module 202 continuously monitors and acquires the voltage change values of the first audio control unit 101, the second audio control unit 102, the third audio control unit 103, and the fourth audio control unit 104. When it detects a change in the voltage value output by the first audio control unit 101, the calling module 203 invokes the pre-set and stored audio parameter adjustment mapping table to find the audio parameter scale corresponding to the voltage change value, that is, mapping the original binary number (0-1023) to an audio parameter scale (0.0-1.0) or (0%-100%), and simultaneously outputs an adjustment drive signal. Then, the audio processing module 204 adjusts the audio signal parameters of the first audio application 2051 entering the first virtual drive channel 2055 according to this adjustment drive signal.

Similarly, users can manually adjust the second audio control unit 102 to independently adjust the audio parameters of the game, manually adjust the third audio control unit 103 to independently adjust the audio parameters of the game (assuming a separate set for game audio), or manually adjust the fourth audio control unit 104 to independently adjust the audio parameters of the music.

It is noteworthy that in this embodiment, the first audio control unit 101, the second audio control unit 102, the third audio control unit 103, and the fourth audio control unit 104 do not directly process audio signals. Instead, they function as high-precision sensors, converting their positional changes into a series of digital control instructions (such as MIDI messages). These instructions are received and parsed in real-time by the audio software in the terminal 20 through interfaces like USB, and are mapped to a specific audio parameter value (gain coefficient) within the software (application). Ultimately, the audio processing engine (CPU or DSP) uses these parameter values as arithmetic instructions to perform real-time multiplication operations on each digital audio sample point flowing through, thereby changing its amplitude and achieving precise control over audio parameters. Therefore, the scheme of the microprocessor 105 acquiring adjustment signals through physical controls is a technically mature and well-established approach. Specific details regarding data flow and algorithms are not elaborated further in this embodiment.

In the audio adjustment system provided by the present disclosure, starting from the user manually adjusting the first audio control unit 101, the second audio control unit 102, the third audio control unit 103, or the fourth audio control unit 104, their positional changes are converted into voltage change signals and sent to the terminal 20. The terminal 20 then invokes an audio parameter adjustment mapping table to output an adjustment drive signal, thereby adjusting the audio parameters of the corresponding audio program. The entire loop process has extremely low latency, generally less than 50 ms, ensuring that the operation does not introduce a sense of delay.

Figure 3:
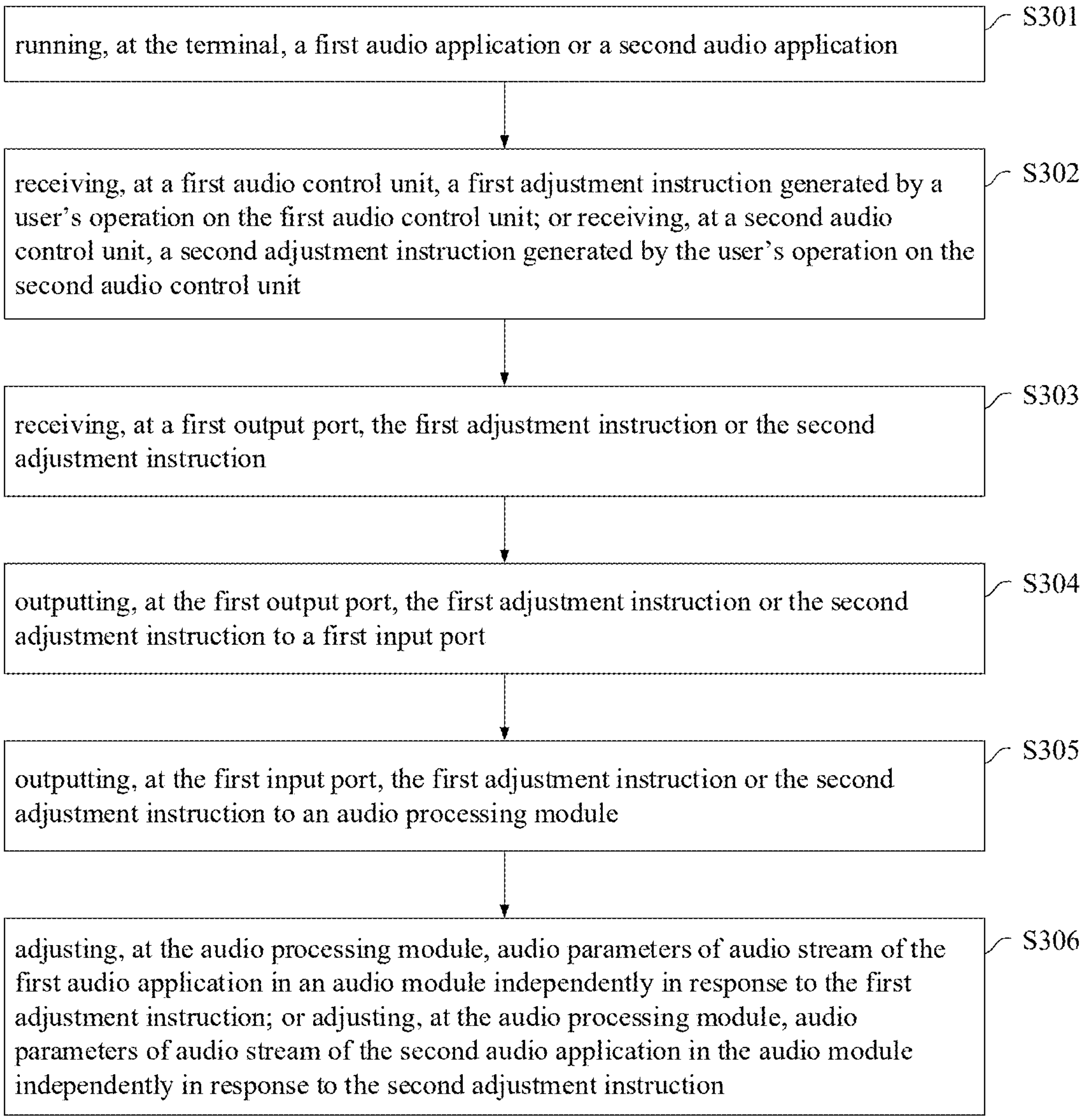
FIG. 3 is a flow chart of an audio adjustment method according to an embodiment of the present disclosure.

FIG. 3 is a flowchart of an audio adjustment method according to an embodiment of the present disclosure. According to this method, users can adjust the audio parameters of different applications using different physical audio control units. In this embodiment, there are at least two physical audio control units.

Step S301: Run the first audio application 2051 and the second audio application 2052 on terminal 20. In this embodiment, the first audio application 2051 and the second audio application 2052 can be actual audio software running on the terminal 20 or virtual audio software pre-created and installed on the terminal 20, which are respectively controlled by the first audio control unit 101 and the second audio control unit 102 through physical mapping via virtual faders.

Step S302: The first audio control unit 101 receives the first adjustment instruction input by the user through physical operation, and the second audio control unit 102 receives the second adjustment instruction input by the user through physical operation.

Step S303: The first output port 107 receives the first and second adjustment instructions. In this embodiment, the microprocessor 105 reads the voltage change values output by the first audio control unit 101 and the second audio control unit 102. When the voltage change values are digital voltage signals, the microprocessor 105 outputs these digital voltage values to the first output port 107. When the voltage change values are analog voltage signals, the AD converter 106 converts these analog voltage signals into digital voltage signals and then outputs them to the first output port 107.

Step S304: The first output port 107 outputs the first and second adjustment instructions to the first input port 201.

Figure 4:
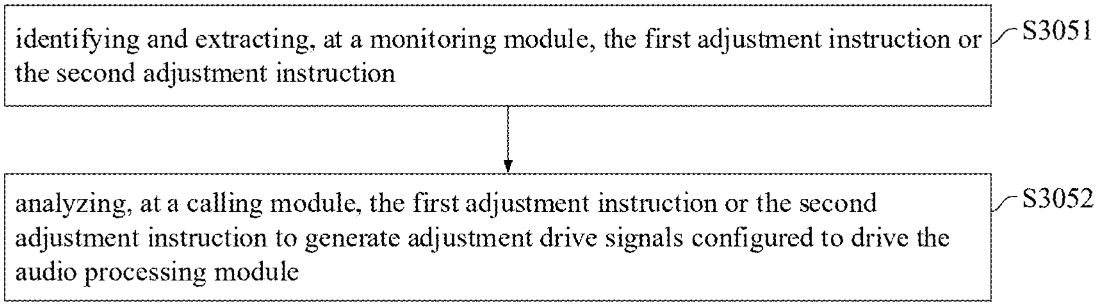
FIG. 4 is a flow chart of step 305 in FIG. 3.

Step S305: The first input port 201 outputs the first and second adjustment instructions to the audio processing module 204. In this embodiment, step S305 further includes the following specific steps, as shown in FIG. 4. Step S3051: The monitoring module 202 identifies and extracts the first and/or second adjustment instructions output by the first input port 107. Step S3052: The calling module 203 analyzes the first and/or second adjustment instructions and generates an adjustment drive signals to drive the audio processing module 204. Specifically, the calling module 203 invokes an audio parameter adjustment mapping table that maps digital voltage values to audio parameter scales. This audio parameter adjustment mapping table is pre-set and stored in the terminal 20. Based on this mapping table, the calling module 203 determines the audio parameter scale corresponding to the digital voltage signal monitored by the monitoring module 202, generates an adjustment drive signal, and outputs it to the audio processing module 204.

Step S306: In response to the first adjustment instruction, the audio processing module 204 adjusts the audio parameters of the audio stream of the first audio application 2051 in the audio module 205 independently. In response to the second adjustment instruction, the audio processing module 204 adjusts the audio parameters of the audio stream of the second audio application 2052 in the audio module 205 independently. In this embodiment, the audio signals output by the first audio application 2051 and the second audio application 2052 enter the first virtual drive channel 2055 and the second virtual drive channel 2056, respectively. Then, the processing chip 2041 in the audio processing module 204 adjusts the audio signals in the first virtual drive channel 2055 according to the first adjustment instruction, and the processing chip 204 adjusts the audio data in the second virtual drive channel 2056 according to the second adjustment instruction.

In the audio adjustment method of the present disclosure, users first run multiple audio applications on the terminal 20, making the audio parameters output by these applications controllable by the audio control units on the control device 10. When a user needs to adjust the audio volume of a certain program, they simply manually adjust the corresponding audio control unit on the control device 10. As a result, the voltage value of this audio control unit changes. The microprocessor 105 reads the voltage change value of the above-mentioned audio control unit and outputs it to the first input port 201 of the terminal 20 via the first output port 107. Meanwhile, the monitoring module 201 in the terminal 20 detects this voltage change value, and the calling module 203 invokes the audio parameter adjustment mapping table and generates an adjustment drive signal. Thus, the processing chip 2041 in the audio processing module 204 completes the audio parameter adjustment of the corresponding audio application according to the above-mentioned adjustment drive signal.

In summary, by introducing a background daemon program, the terminal 20 in the present disclosure successfully overcomes the technical limitation of physical controls of traditional sound cards, which can only adjust the system's main volume. Firstly, it creates independent audio channels for each application, separating the audio streams of different software before mixing. The physical controls on the sound card no longer directly control the system's main audio parameters. Instead, they function as high-precision input devices, transmitting their positional information in real-time to the daemon program on the terminal 20. This program then precisely adjusts the audio parameters of the specified audio applications. Comparing to the cumbersome process in existing technologies, which forces users to interrupt their current operations and manually search for the adjustment object in the software interface, this solution enables users to directly control the volume of specific software (such as in-game voice chat or background music) in real-time and seamlessly through physical controls without leaving the main application window. This greatly enhances intuitiveness, convenience, and immersion of multi-task audio management operations.

Specifically, in accordance with the embodiments of this disclosure, the processes described above with reference to the flowcharts can be implemented as computer software programs. For instance, the embodiments of this disclosure encompass a computer program product that includes a computer program carried on a non-volatile computer-readable medium. This computer program includes program codes for executing the methods illustrated in the flowcharts. In such embodiments, the computer program can be downloaded and installed from a network via a communication section and/or installed from a removable medium. When executed by a central processing unit (CPU), the computer program performs aforementioned functions defined in the methods of the present disclosure. It should be noted that the non-volatile computer-readable medium mentioned in the present disclosure can be a computer-readable signal medium, a computer-readable storage medium, or any combination of the two. A computer-readable storage medium may include, but is not limited to, systems, devices, or apparatuses based on electricity, magnetism, optics, electromagnetism, infrared rays, or semiconductors, or any combination thereof. More specific examples of computer-readable storage media include, but are not limited to, electrical connections with one or more wires, portable computer disks, hard disks, random-access memories (RAMs), read-only memories (ROMs), erasable programmable read-only memories (EPROMs or flash memories), optical fibers, portable compact disk read-only memories (CD-ROMs), optical storage devices, magnetic storage devices, or any suitable combination thereof. In the present disclosure, a computer-readable storage medium can be any tangible medium that contains or stores a program, which can be used by or in conjunction with an instruction execution system, apparatus, or device. Meanwhile, a computer-readable signal medium in the present disclosure may include a data signal propagated in a baseband or as part of a carrier wave, which carries computer-readable program code. Such propagated data signals can take various forms, including, but not limited to, electromagnetic signals, optical signals, or any suitable combination thereof. A computer-readable signal medium can also be any computer-readable medium other than a computer-readable storage medium, which can transmit, propagate, or convey a program for use by or in conjunction with an instruction execution system, apparatus, or device. The program codes contained on a computer-readable medium can be transmitted using any appropriate medium, including, but not limited to, wireless, wired, optical cables, RF, etc., or any suitable combination thereof.

The computer program codes for executing the operations of the present disclosure can be written in one or more programming languages or combinations thereof, including object-oriented programming languages such as Python, Java, Smalltalk, and C++, as well as conventional procedural programming languages such as the "C" language or similar programming languages. The program codes can be executed entirely on the user's computer, partially on the user's computer, as a standalone software package, partially on the user's computer and partially on a remote computer, or entirely on a remote computer or a server. In scenarios involving remote computers, the remote computer can be connected to the user's computer via any type of network, including a local area network (LAN) or a wide area network (WAN), or it can be connected to an external computer (for example, via the Internet using an Internet service provider).

The flowcharts and block diagrams in the accompanying figures illustrate the possible architectural frameworks, functions, and operations of systems, methods, and computer program products according to various embodiments of the present disclosure. In this regard, each block in the flowcharts or block diagrams can represent a module, a program segment, or a portion of codes that includes one or more executable instructions for implementing specified logical functions. It should also be noted that in some alternative embodiments, the functions annotated in the blocks may occur in a different order than that shown in the figures. For example, two consecutively represented blocks may actually be executed substantially in parallel, and they may sometimes be executed in reverse order, depending on the functions involved. It is also important to note that each block in the block diagrams and/or flowcharts, as well as combinations of blocks in the block diagrams and/or flowcharts, can be implemented using a dedicated hardware-based system that performs specified functions or operations, or they can be implemented using a combination of dedicated hardware and computer instructions.

The units described in the embodiments of the present disclosure can be implemented in software, hardware, or a combination thereof. The described units can also be placed in a processor. The names of these units do not, in certain cases, constitute a limitation on the units themselves. For example, a trigger unit can also be described as an "interception unit for network request packets."

The above descriptions merely represent preferred embodiments of the present disclosure and explanations of the technical principles employed. Those skilled in the art should understand that the scope of the invention involved in the present disclosure is not limited to the specific technical solutions formed by the particular combination of the aforementioned technical features. It should also encompass other technical solutions formed by any combination of the aforementioned technical features or their equivalent features without deviating from the aforementioned inventive concept. For example, technical solutions formed by mutually replacing the aforementioned features with (but not limited to) features having similar functions disclosed in the present disclosure.

In the figures of this embodiment, identical or similar labels correspond to identical or similar components. In the descriptions of the present disclosure, it should be understood that terms indicating orientation or positional relationships, such as "upper," "lower," "left," and "right," are based on the orientation or positional relationships shown in the figures. These terms are used merely to facilitate the description of the present disclosure and simplify the descriptions, rather than indicating or implying that the devices or elements referred to must have a specific orientation or be constructed and operated in a specific orientation. Therefore, the terms used to describe positional relationships in the figures are for illustrative purposes only and should not be construed as limiting this patent. For ordinary technicians in the field, the specific meanings of the aforementioned terms can be understood based on the specific context.

The above descriptions merely represent preferred embodiments of the present disclosure and explanations of the technical principles employed. Those skilled in the art should understand that the scope of the invention involved in the present disclosure is not limited to the specific technical solutions formed by the particular combination of the aforementioned technical features. It should also encompass other technical solutions formed by any combination of the aforementioned technical features or their equivalent features without deviating from the aforementioned inventive concept. For example, technical solutions formed by mutually replacing the aforementioned features with (but not limited to) features having similar functions disclosed in the present disclosure.

What is claimed is:

1. An audio adjustment system, comprising:

a control device, comprising a first audio control unit, a second audio control unit, and a first output port; wherein the first audio control unit is configured to receive a first adjustment instruction based on user's input and to output the first adjustment instruction to the first output port; the second audio control unit is configured to receive a second adjustment instruction base on the user's input and to output the second adjust instruction to the first output port;

a terminal, comprising a first input port, an audio processing module, and an audio module, wherein the first input port is electrically connected to the first output port and is configured to receive the first adjustment instruction and the second adjustment instruction through the first output port and to output the first adjustment instruction and the second adjustment instruction to the audio processing module; and wherein, the audio module comprises a first audio application and a second audio application running on the terminal, the audio processing module is configured to adjust audio parameters of audio stream of the first audio application in response to the first adjustment instruction and to adjust audio parameters of audio stream of the second audio application in response to the second adjustment instruction; and the first adjustment instruction and the second adjustment instruction are generated based on the user's physical operations on the first audio control unit and the second audio control unit respectively;

wherein the audio processing module comprises a processing chip; the audio module comprises a first virtual drive channel and a second virtual drive channel; wherein audio signals output by the first audio application and the second audio application respectively enter into the first virtual drive channel and the second virtual drive channel; the processing chip is configured to adjust audio parameters of the audio signals in the first virtual drive channel according to the first adjustment instruction, and to adjust audio parameters of the audio signals in the second virtual drive channel according to the second adjustment instruction; and the audio parameters of the audio signals comprise a volume, a grain, pitch, an audio effect, reverb, or an equalizer.

2. The audio adjustment system according to claim 1, wherein the first audio control unit is a linear potentiometer or a rotary potentiometer; the second audio control unit is a linear potentiometer or a rotary potentiometer; the control unit further comprises a microprocessor and an analog-to-digital converter; the microprocessor is configured to read analog voltage values of the first audio control unit and the second audio control unit; and the analog-to-digital converter is configured to convert the analog voltage values to digital voltage signals and to output the digital voltage signals to the first output port.

3. The audio adjustment system according to claim 1, wherein the first audio control unit is a linear encoder, a rotary encoder, an interactive control surface, or a strike pad; the second audio control unit is a linear encoder, a rotary encoder, an interactive control surface, or a strike pad; the control unit further comprises a microprocessor; and the microprocessor is configured to read digital voltage signals and to output the digital voltage signals to the first output port.

4. The audio adjustment system according to claim 3, wherein the first output port transmits the digital voltage signals to the first input port through a USB HID protocol or a USB MIDI protocol.

5. The audio adjustment system according to claim 1, wherein the audio parameters comprise a volume, a grain, pitch, an audio effect, reverb, or an equalizer.

6. The audio adjustment system according to claim 5, wherein the first audio application and the second audio application are in a background running mode.

7. The audio adjustment system according to claim 6, wherein the first audio application and the second audio application are physical audio software running on the terminal, and the audio processing module is configured to adjust audio parameters of audio data output by the first audio application and the second audio application via an audio API of an operating system of the terminal in response to the first adjustment instruction and the second adjustment instruction, and the audio parameters of the audio data comprise the volume.

8. The audio adjustment system according to claim 6, wherein the first audio application and the second audio application are virtual audio software preset on the terminal, the audio processing module is configured to adjust audio parameters of audio data output by the first audio application and the second audio application via the virtual audio software in response to the first adjustment instruction and the second adjustment instruction, and the audio parameters of the audio data comprise the volume, the grain, the pitch, the audio effect, the reverb, or the equalizer.

9. The audio adjustment system according to claim 1, wherein the first output port is communicated with the first input port via a wired connection.

10. The audio adjustment system according to claim 9, wherein the first output port and the first input port are respectively connected to both opposite ends of a digital transmission cable, the first output port is a USB-A connector or a Type-C connector; and the first input port is a USB-A connector or a Type-C connector.

11. The audio adjustment system according to claim 1, wherein the first output port is communicated with the first input port via a wireless connection.

12. The audio adjustment system according to claim 11, wherein the first output port is a wireless transmission chip, and the first input port is a wireless transmission chip; and the first output port and the first input port are connected and communicated based on a 2.4 GHz wireless private transmission protocol, a Bluetooth® protocol or an ultra-high frequency UHF wireless protocol.

13. The audio adjustment system according to claim 11, wherein the first output port is a wireless transmission chip, and the first input port is a wireless receiver capable of being hot-swapped and connected to the terminal; and the first output port and the first input port are connected and communicated based on a 2.4 GHz wireless private transmission protocol, a Bluetooth® protocol or an ultra-high frequency UHF wireless protocol.

14. The audio adjustment system according to claim 1, wherein the terminal further comprises a listening module and a calling module; the listening module is electrically connected to the first input port and is configured to listen, identify and extract the first adjustment instruction and the second adjustment instruction output from the first input port, and then to output the first adjustment instruction and the second adjustment instruction to the calling module; the calling module is configured to analyze the first adjustment instruction and the second adjustment instruction to generate an adjustment drive signal for driving the audio processing module; the calling module is further configured to output the adjustment drive signal to the audio processing module; and the audio processing module is configured to adjust the audio parameters of the first audio application and the second audio application in the audio module according to the adjustment drive signal.

15. The audio adjustment system according to claim 1, wherein the control device further comprises a third audio control unit and a fourth audio control unit; the third audio control unit is configured to receive a third adjustment instruction input by the user and output the third adjustment instruction to the first output port; the fourth audio control unit is configured to receive a fourth adjustment instruction input by the user and output the fourth adjustment instruction to the first output port; there are third audio application and fourth audio application running on the terminal; the audio processing module is further configured to adjust audio parameters of audio stream of the third audio application in response to the third adjustment instruction; and adjust audio parameters of audio stream of the fourth audio application in response to the fourth adjustment instruction; and both the third adjustment instruction and the fourth adjustment instruction are generated based on the user's physical operations on the third audio control unit and the fourth audio control unit respectively.

* * * * *